(12) United States Patent
Staring

(10) Patent No.: US 6,457,127 B1
(45) Date of Patent: Sep. 24, 2002

(54) METHOD OF AND DEVICE FOR GENERATING A KEY

(75) Inventor: Antonius A. M. Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/232,907

(22) Filed: Jan. 15, 1999

(30) Foreign Application Priority Data

Nov. 19, 1998 (EP) .............................................. 98203890

(51) Int. Cl.[7] .......................... G11B 20/00; G06F 12/14
(52) U.S. Cl. ...................... 713/193; 380/200; 380/201; 380/44; 705/57; 705/51
(58) Field of Search ................................ 380/200, 201, 380/202, 278, 289, 44, 203; 705/50, 51, 56, 57, 58

(56) References Cited

FOREIGN PATENT DOCUMENTS

| EP | 0644474 A1 | 3/1995 | ............. G06F/1/00 |
|---|---|---|---|
| EP | 0756279 A2 | 1/1997 | ........... G11B/20/00 |

OTHER PUBLICATIONS

"Applied Cryptography", 2nd Edition, B. Schneider, pp. 442–445.

Primary Examiner—Ly V. Hua
(74) Attorney, Agent, or Firm—Michael E. Belk

(57) ABSTRACT

A key is generated to control the access to information on an information carrier. The key is derived from an M-bit master key and an information carrier key. Apparatus to read and/or write information on an information carrier generates the M-bit master key. The information carrier key is derived from the information carrier. The M-bit master key is derived from only a part of an N-bit string, the part being determined by a number p derived from an identifier R associated with recording information on the information carrier.

17 Claims, 5 Drawing Sheets

METHOD OF AND DEVICE FOR GENERATING A KEY

BACKGROUND OF THE INVENTION

The invention relates to a method of generating a key for controlling the access to information on an information carrier, which key comprises an M-bit master key originating from a read and/or write apparatus which cooperates with the information carrier and an information carrier key originating from the information carrier.

The invention further relates to a read and/or write apparatus including means for cooperating with an information carrier, further including means adapted to generate an M-bit master key for generating a key for controlling the access to information on an information carrier.

The invention further relates to an information carrier having a information carrier key for controlling the access to information on the information carrier.

The method in accordance with the invention can be used in a copy-protection system aimed at preventing illegal copying of information by storing this information on an information carrier in encrypted form.

A method of the type defined in the opening paragraph is known from, inter alia, European Patent Application EP-A 0 644 474. Said document describes a method of preventing illegal copying of information from one information carrier to another. This method can be used in systems where, for example for reasons of confidentiality, the information to be transmitted is encrypted and can subsequently be decrypted with the aid of the key to be generated. Said method can also be utilized in so-called access systems, where the presence of the correct key is required in order to gain access to given information systems, such as for example data bases.

SUMMARY OF THE INVENTION

To this end, a key comprising an M-bit master key originating from a device and an information carrier key originating from the information carrier is generated in order to control the access to the information on the information carrier. This M-bit master key forms part of the so-called shared secret, which must remain a secret in order to assure that access to the information on the information carrier is restricted to users who copy information from the one information carrier to the other in a legal manner.

When the information is copied from the one information carrier which carries the key to another information carrier, this information carrier key is not passed on. As a result of this, it is not possible to generate a correct key by means of the last-mentioned information carrier. Consequently, this information carrier cannot be played back on a device requiring this key.

If a recording of information is to be read from an illegally copied information carrier the key, required to allow this, cannot be generated because the relevant information carrier key will not be found on the information carrier. This is in contradistinction to the so-called identifiers R associated with the relevant information recordings, which can usually be found on the illegally copied information carrier.

On account of statutory restrictions or limitations imposed on the computing time a comparatively small M-bit master key is used. A comparatively small M-bit master key has the drawback that in general it is readily compromised. Compromising is to be understood to means the disclosure of the content of the key in that a given information carrier is hacked. As a result of this hacking, the M-bit master key becomes known. With the knowledge of this M-bit master key it is then possible to make illegal copies if the information carrier key has also been compromised.

In the case that the M-bit master key, which is part of the shared secret, is no longer a secret, it could be necessary to replace the compromised key, which may entail substantial cost and inconvenience for the user of the information. In existing cryptographic systems for secure communication the key material is replaced regularly. In such systems (for example broadcast systems) the key material is replaced at the instant that the key material used until then has been or is likely to be compromised. When the invention is applied to copy protection of stored information the replacement of the key material poses a problem because material encrypted with the old key material is to be played back. This is in contradistinction to, for example, broadcast systems in which the data broadcast in the past need no longer be protected against illegal decryption.

It is another object of the invention to preclude illegal copying of information from the one information carrier to the other using a comparatively small M-bit master key and to achieve that if the key material of a protected information carrier is compromised the copy protection system remains intact with an acceptable probability.

To this end, the method in accordance with the invention is characterized in that the M-bit master key is selected from an N-bit string by determining a number p, in dependence upon an identifier R, the identifier R being associated with a recording of information on the information carrier, and by reading the N-bit string from a position defined by the number p, N being substantially greater than M.

By selecting the M-bit master key from a comparatively large shared secret, the N-bit string, in dependence on an identifier R, which is associated with a recording of information on an information carrier, a large number of unique M-bit master keys can be generated.

This has the advantage that compromising of one or a small number of the selected M-bit master keys will not result in immediate loss of the copy protection. If one or a small number of the selected M-bit master keys is/are compromised it is possible that previous recordings made with those keys and future recordings which will be made are copied illegally by means of these M-bit master keys.

It is not possible to determine in advance whether the next recording can be copied because it is not possible to predict whether a compromised M-bit master key or a non-compromised M-bit master key will be used. This is not possible because the number p is derived from the identifier R via cryptographic techniques such as hash functions. As a result of this, compromising of one or a large number of the selected M-bit master keys will be even less harmful for the copy protection.

The present invention enables the use of a large shared secret and enables this large shared secret to be used for the generation of keys of limited key length. The computing time required for generating the key and subsequently encrypting or decrypting the information can thus be limited. As a result of the size of the shared secret it will take a longer time before it can be compromised completely. Compromising of a single M-bit master key will then only result in a gradual degradation of the copy protection in the copy protection system rather than in an abrupt loss of the copy protection.

The invention is inter alia based on the recognition of the fact that use can be made of a large shared secret, namely the N-bit string from which the M-bit master key is selected for each recording of information to be protected against illegal copying. Thus, it is possible to have a large shared secret and yet to comply with restraints imposed on the permissible size of the M-bit master key.

Another variant is characterized in that, in addition, said number p is dependent upon the information carrier key.

Since the number p depends both upon the identifier R and on the information carrier key it is possible to generate a large number of unique M-bit master keys.

Another variant is characterized in that said identifier R is associated with a recording sequence number.

By associating the identifier R with a recording sequence number it is possible to generate another M-bit master key for each recording of information. As a rule, only the information of one recording can be copied illegally in the case that one M-bit master key is compromised, without enabling recordings made shortly before or shortly after this to be copied illegally.

Possible examples of relationships between the identifier R and the recording sequence number are: R is a pseudo-random number, R is a date/time field, R is related to other information associated with the recording.

A further variant is characterized in that said identifier R is present on the information carrier.

By storing the identifiers R on the information carrier it is possible to copy also the respective identifiers R when the information carrier is wholly or partly copied. In this case the information carrier usually stores a large number of identifiers each related to an information recording. For example in the case of a CD-R or CD-RW information carrier, an identifier R can be related to a recording sequence number. In that case it is possible to generate another M-bit master key for each information recording. Alternatively, for example in the case of prerecorded CD-ROM or CD-Audio information carrier, an identifier R can be related to a part of the information on the information carrier.

A further variant is characterized in that said identifier R is present in the read and/or write apparatus which cooperates with the information carrier.

If the identifier R is present in the read and/or write apparatus which cooperates with the information carrier the apparatus can be related to the information carrier. The relevant information carriers can then be read and inscribed only in this apparatus.

A further variant is characterized in that the number p is derived unambiguously by applying said identifier R to a hash function.

The number p can be obtained by performing a so-called hash function, which preferably forms part of the shared secret, upon an identifier R associated with a recording sequence number and present on the information carrier. The use of a hash function makes it impossible to relate the M-bit key to the visible identifier R. As long as the operation of the one-way hash function remains a secret it is impossible to relate the input of a hash function to the output.

A further variant is characterized in that i numbers p are determined, namely a first number $P_1$ through an $i^{th}$ number $p_i$, in that i substrings are determined, namely an $M_1$-bit substring, determined by reading out the N-bit string from a position $q_1$ defined by the first number $p_1$, through an $M_i$-bit substring, determined by reading out the N-bit string from a position $q_i$ defined by the $i^{th}$ number $p_i$, after which the M-bit master key is formed by combining the i substrings.

When the M-bit master key is determined by combining the substrings read from the N-bit string the number of different M-bit master keys that are possible is increased. Owing to this, compromising of one or a small number of the selected M-bit master keys will hardly result in the abrupt loss of the copy protection. This combination can be effected by concatenating the i substrings. Besides, it is also possible to exor the i substrings in order to generate the M-bit master key.

The read and/or write apparatus in accordance with the invention is characterized in that the apparatus further includes means for selecting the M-bit master key from an N-bit string, the M-bit master key being selected in dependence upon an identifier R, which is associated with a recording of information on the information carrier, by determining a number p depending on the identifier R and by reading the N-bit string from a position defined by the number p, N being substantially greater than M.

Another variant of the read and/or write apparatus is characterized in that, in addition, said number p is dependent on the information carrier key.

The information carrier in accordance with the invention is characterized in that the information carrier carries an identifier R associated with a recording of information on the information carrier.

BRIEF DESCRIPTION OF THE DRAWINGS

These and other aspects of the invention will be apparent from and will be elucidated by means of the following description of the embodiments with reference to the accompanying drawings, in which.

DETAILED DESCRIPTION OF THE INVENTION

Figure 1:
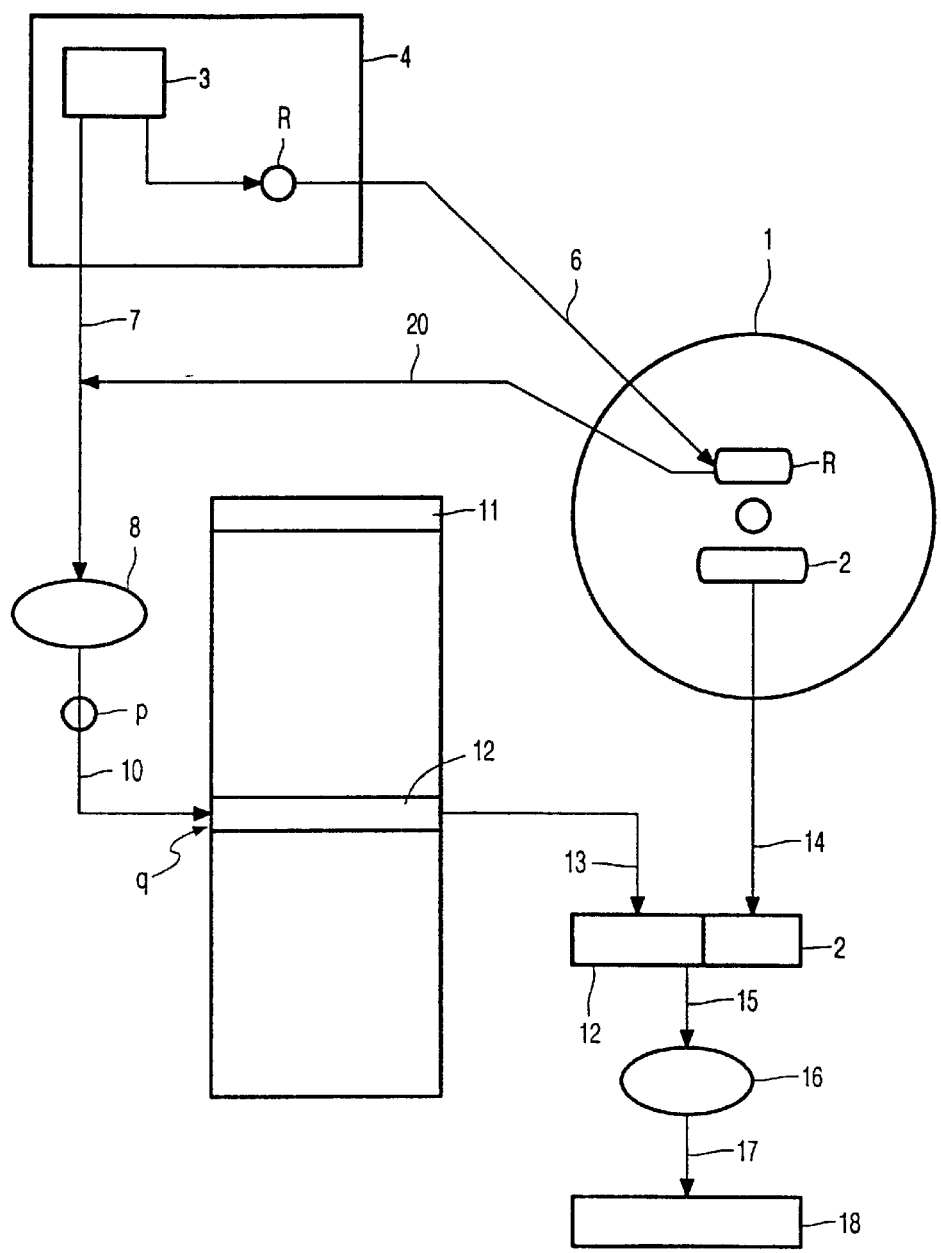
FIG. 1 shows a first variant of the method in accordance with the invention.

A first variant of the method in accordance with the invention is described with reference to FIG. 1, in which an M-bit master key 12 is derived by determining a number p and by reading an N-bit string 11 from a position q defined by the number o, the number p being derived unambiguously by means of an identifier R related to a recording sequence number and present on an information carrier 1. The method can be used in the case that information is recorded on the information carrier 1 and in the case that information is read from the information carrier.

In the first case information is recorded on the information carrier 1. In an apparatus 4 the identifier R is selected with the aid of a recording sequence number generated by recording sequence number generating means adapted to generate this recording sequence number (which identifier R can be selected for example by applying the recording sequence number to a random number generator). Subsequently, this identifier R is stored on the information carrier 1 via a first step 6. The identifier R is further applied to a first hash function 8 via a second step 7. Using a hash function and keeping it a secret ensures that the number p cannot be derived from a known identifier R.

The output of the hash function 8 is the number p, which is applied to a shared secret in the form of an N-bit string 11 via a third step 10. The number p defines the position q from which the N-bit string 11 is read in order to generate the M-bit master key 12. After the M-bit master key 12 has been read out it is combined with an information carrier key 2 via a fourth step 13. The information carrier key 2 is combined with the M-bit master key 12 via a fifth step 14. These two parts, the M-bit master key 12 and the information carrier key 2, are applied to a second hash function 16 via a sixth step 15. This second hash function can be the same hash function as the first hash function 8. The output of the second hash function 16 via a seventh step 17 is a key 18.

In the present case, when a hash function is used the position q will step through the N-bit string 11 in a random manner each time that the recording sequence number is incremented. Consequently, the M-bit master key to be generated and associated with the identifier R having the recording sequence number X cannot be related to the M-bit master key associated with the identifier R having the recording sequence number X+1.

In the second case, information is read from the information carrier 1. The identifier R from the information carrier 1 is then applied to the first hash function 8 via an eighth step 20. After the M-bit master key 12 has been combined with the information carrier key 2 in known manner these two parts are applied to a second hash function 16. By means of the key 18, which is the output of the second hash function 16, it is possible to read the information present on the information carrier 1 in a correct manner.

Figure 2:
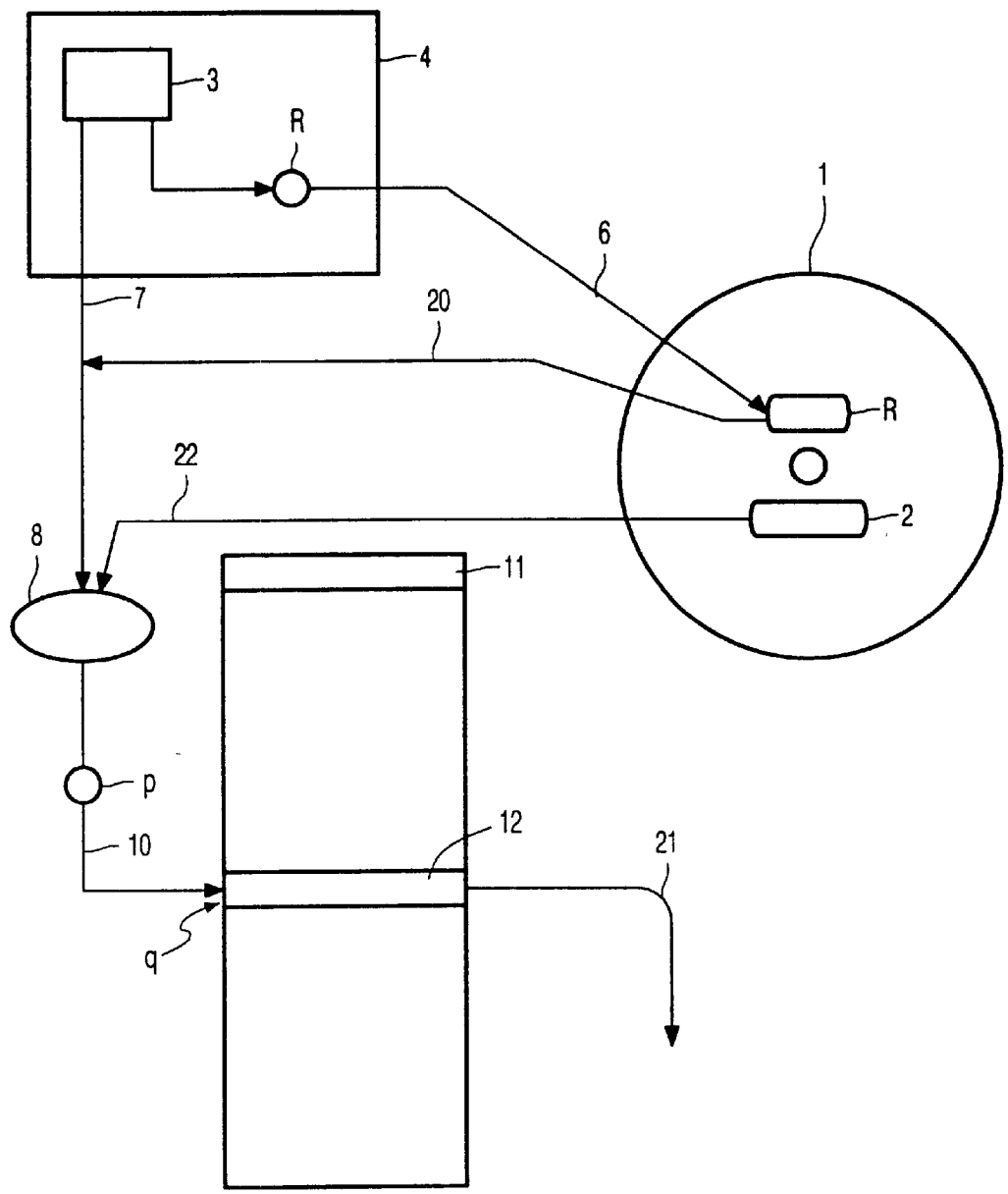
FIG. 2 shows a second variant.

A second variant of the method in accordance with the invention is described with reference to FIG. 2. In this case, the number p is not derived by merely applying the identifier R to the first hash function 8 as shown in FIG. 1 but by, in addition, applying the information carrier key 2 to the first hash function 8 via a step 22. Here, the number p also defines the position q from which the N-bit string 11 is read in order to generate the M-bit master key 12. The M-bit master key 12 becomes available via a step 21 for the encryption or decryption of information.

Figure 3:
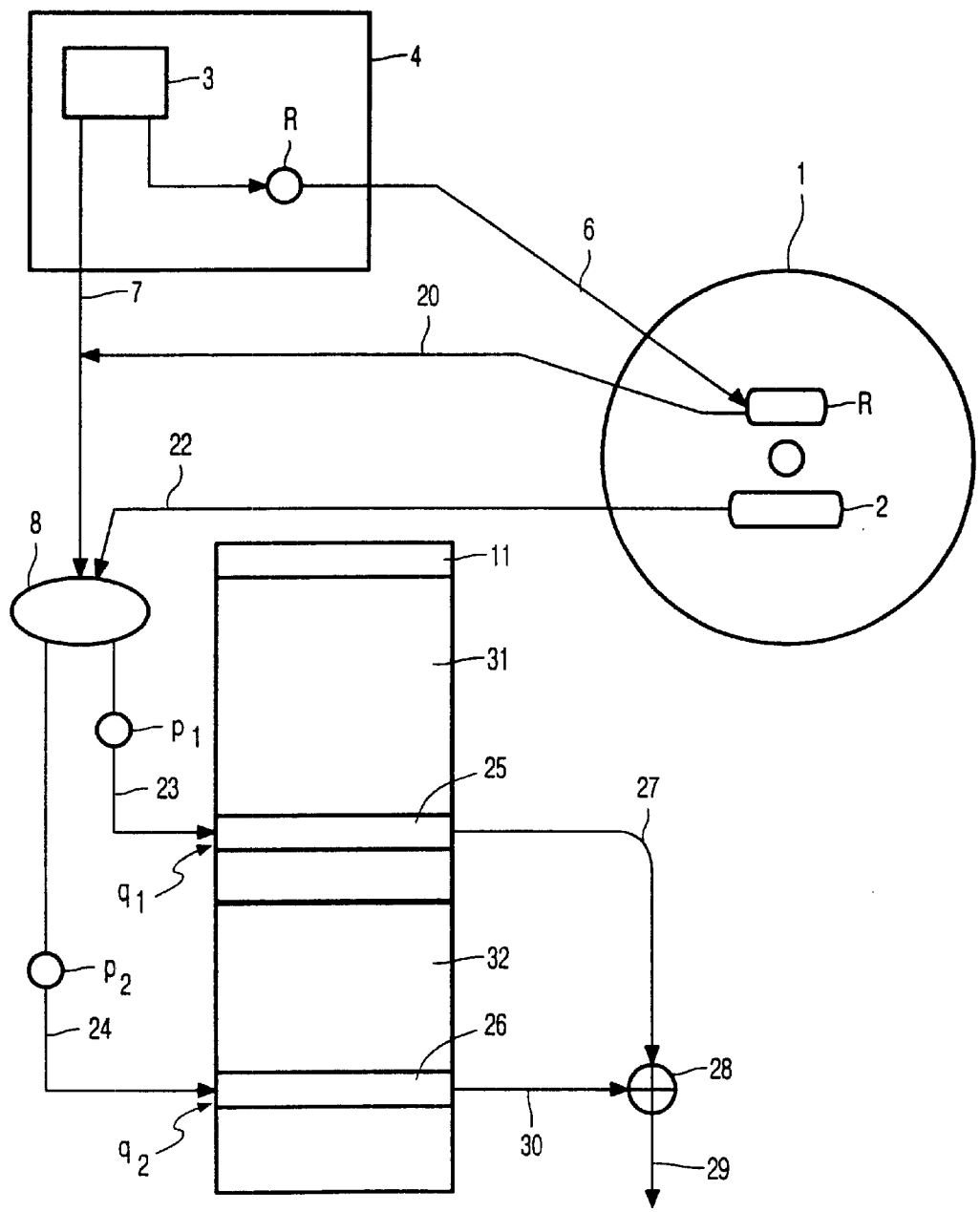
FIG. 3 shows a third variant.

In a third variant, described with reference to FIG. 3, the identifier R and the information carrier key 2 are not used to derive a single number p but to derive two numbers $p_1$ and $p_2$.

The identifier R, together with the information carrier key, is applied to the first hash function 8. The output of the hash function is formed by two numbers, $p_1$ and $p_2$. The number $p_1$ is applied to the N-bit string via a step 23. In the present case, the N-bit string is divided into a first part 31 of the N-bit string and a second part 32 of the N-bit string. The position $q_2$ defined by the number $p_1$ defines an O-bit substring in that the first part 31 of the N-bit string is read from position $q_1$. The number $P_2$ is applied to the N-bit string via a step 24. The position $q_2$ defined by the number $p_2$ defines a Q-bit substring 26 in that the second part 32 of the N-bit string is read from position $q_2$.

The M-bit master key is subsequently determined by applying, via a step 27, the O-bit substring 25 and, via a step 30, the Q-bit substring 26 to an XOR function 28. After the XOR function has been carried out the M-bit master key becomes available via a step 29 for the encryption or decryption of information. In the present variant the M-bit master key can also be generated by concatenating the O-bit substring 25 and the Q-bit substring 26.

In this way, the number of different M-bit master keys that are possible is substantially larger than in the case that only a single number p is determined. Owing to this, compromising of one or a small number of the selected M-bit master keys is even less likely to result in the abrupt loss of the copy protection.

It will be obvious to those skilled in the art that the above method can be extended to methods in which more than two numbers p are determined so as to increase the number of different M-bit master keys that are possible even further.

In another variant the different identifiers R are stored separately from the information carrier in the apparatus or in another device which cooperates with the apparatus. An information carrier can then only be read on a given associated apparatus. If the identifiers R are stored in the apparatus the associated information carrier key should also be stored in such a way that the identifiers R can be related to the relevant information carrier. If the identifiers R are stored in another device which cooperates with the apparatus this can be effected, for example, on a so-called smart card. Moreover, the access to a given information recording can be linked to a PIN code to be entered externally.

It is to be noted that, in general, the identifier R is non-secret and is transferred when information is copied from the one information carrier to the other information carrier. However, the information carrier key is not accessible and should remain a secret and should not be transferred when information is copied from the one information carrier to the other information carrier. Secrecy is not necessary (but is to be preferred) for the information carrier key as long as this key cannot be influenced by a user.

Furthermore, it is to be noted that the information carrier key or the system by means of which it can be read out may become compromised, as a result of which the security is maintained only by the M-bit master key. Disclosure of the shared secret, of which the M-bit master key forms a part, should therefore be precluded.

A suitable hash function as can be used in the described method for the conversion of the identifier R to a number p is based on an SHA (Secure Hash Algorithm). This is a standardized hash function developed by NIST. A description of the SHA can be found, for example, in "Applied Cryptography", $2^{nd}$ edition, B. Schneider, pp. 442–445. A characteristic feature of a hash function is that its use makes it impossible to relate the output of a hash function to the input. Consequently, it is not possible to derive the input from the associated output. Another feature of a correct hash function is that a slight change of the input results in a substantial change in the output.

Figure 4:
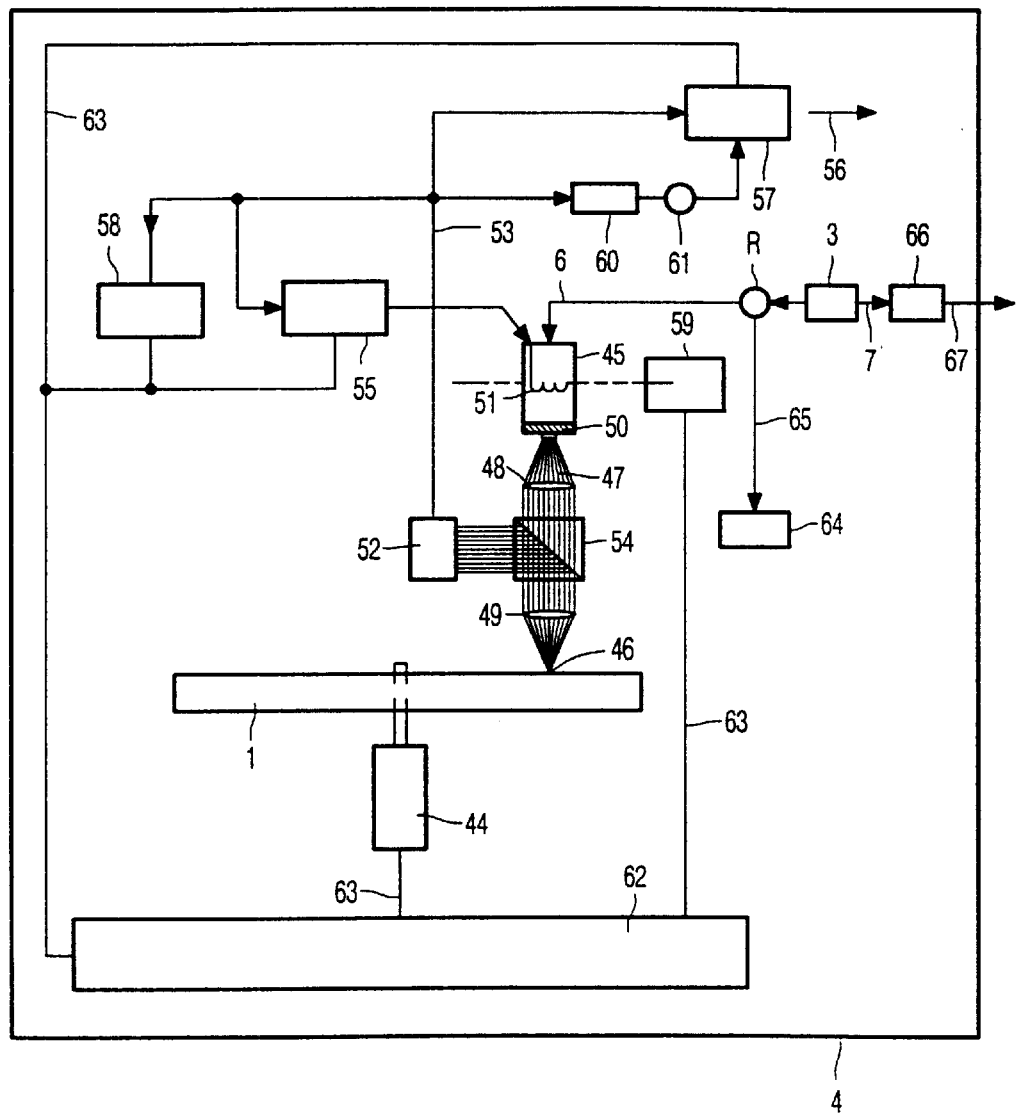
FIG. 4 shows a read and/or write apparatus adapted to generate an M-bit master key.

FIG. 4 shows a read and/or write apparatus 4 adapted to read the information carrier 1. In addition, this apparatus is adapted to record an identifier R related to a recording sequence number on an information carrier. The apparatus has drive means 44 for rotating the information carrier 1 and a read/write head 45 for scanning the tracks on the information carrier. The read/write head 45 comprises an optical system of a known type intended for keeping a light spot 46 focused on a track of the information carrier, which light spot is formed by a light beam 47 which is guided by optical elements such as a collimator lens 48, for collimating the light beam, and an objective lens 49, for focusing the light beam. This light beam 47 is generated by a radiation source 50, for example an infrared laser diode having a wavelength of 780 nm and an optical power of 3 mW. The read/write head 45 further includes an actuator intended for focusing on the information carrier and a tracking actuator 51 for the fine-positioning of the light spot 45 in a radial direction in the center of the track. Tracking by the laser beam can also be effected by varying the position of the objective lens 48. After reflection from the information carrier the light beam 47 is detected by a detector 52 of a known type, for example a quadrant detector and generates detector signals 53 including a read signal, a tracking error signal, a focus error signal, a synchronizing signal and a lock-in signal. For this purpose, it is possible to use for example a beam splitting cube 54, a polarizing beam splitting cube, a pellicle or a retarder.

The read/write head 45 further includes means for receiving a recording sequence number in the form of an identifier R form the recording sequence number generating means via a signal line 6. Subsequently, the recording sequence number is recorded on the information carrier 1 by the read/write head 45. In addition, the recording sequence number is transferred to selection means 66 via a signal line 7. These selection means, which include the N-bit string, are adapted to select the M-bit master key from the N-bit string, for example in a manner in accordance with the method described with reference to FIG. 1. The selected M-bit master key 12 is subsequently transferred via a signal line 67, for example in order to be combined with the information carrier key 14 for the generation of the key 18. The apparatus further includes memory means 64. Via a signal line 65 the identifiers R are stored in the memory means 64. Instead of the identifiers R it is also possible to store the recording sequence numbers in the memory means 64. The value of the recording sequence numbers can be incremented upon a subsequent recording of information. In the case that the identifiers R are not additionally stored on the information carrier it may be desirable to also store the information carrier key 2 or another string characterizing the relevant information carrier 1 in the memory means 64.

The apparatus further has tracking means 55 coupled to the read/write head 45 in order to receive the tracking error signal from the read/write head 45 and in order to control the tracking actuator 51. During reading the read signal is converted into output information, indicated by an arrow 56, in the read means 57, which include for example a channel decoder and an error corrector. The apparatus includes an address detector 58, for detecting the address information fields as described in the invention and for recovering address information from the detector signals 53 when the address information fields of the tracks on the information carrier are read out, and positioning means 59 for the coarse-positioning of the read/write head 45 in a radial direction of the track.

The apparatus further includes detection means 60 for receiving the detector signals 53 from the read/write head 45. The presence and absence of these detector signals 53 is signalled to the timer 61 in order to synchronize the read means 57 for reading out the address information fields. The apparatus further has a system control unit 62 intended for receiving commands from a controlling computer system or from a user and for controlling the apparatus by means of control lines 63, for example a system bus connected to the drive means 44, the positioning means 59, the address detector 58, the tracking means 55 and the read means 57. For this purpose, the system control unit 62 includes a control circuit, for example a microprocessor, a program memory and control gates for carrying out the procedures as described hereinafter. The system control unit can alternatively take the form of a logic state machine in logic circuits.

Figure 5:
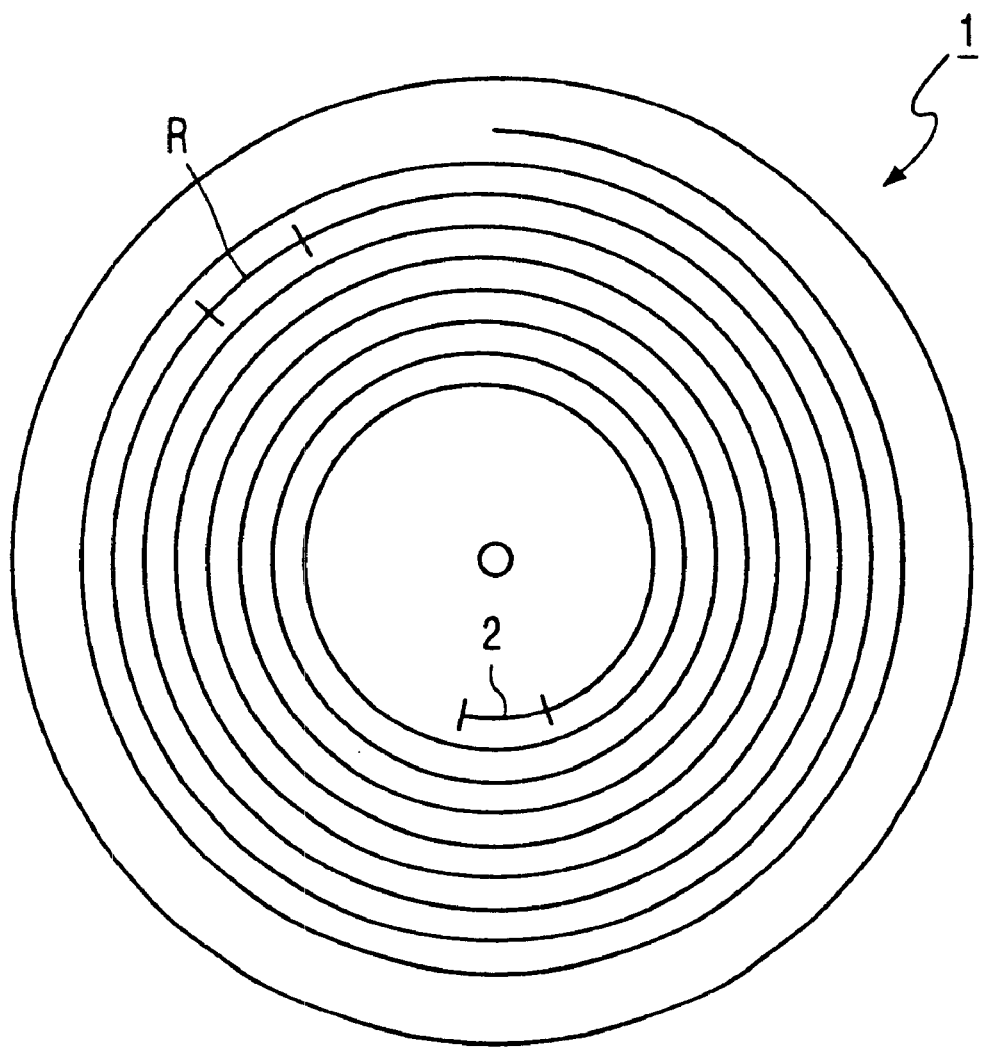
FIG. 5 shows an information carrier having an information carrier key for the generation of a key.

FIG. 5 shows an information carrier 1. The information carrier 1 stores an identifier R associated with a recording sequence number. The function of the identifier R is to generate the M-bit master key. The information carrier further stores an information carrier key 2. The function of the information carrier key 2 is to generate the key 18 together with the M-bit master key 12.

Although the invention has been elucidated herein on the basis of the above embodiments, it obvious that it is possible to use other variants in order to achieve the same goal. Moreover, the invention is assumed to reside in any novel characteristic feature and/or combination of novel features.

What is claimed is:

1. A method of generating an access key for controlling the access to an information carrier, in which method:
   the access key is derived from: an M-bit master key originating from a read and/or write apparatus which cooperates with the information carrier; and an information carrier key originating from the information carrier;
   the M-bit master key is selected from an N-bit string by: determining a number p depending upon an identifier R, the identifier r being associated with recording of information on the information carrier; and reading a portion of the N-bit string from a position defined by the number p, N being substantially greater than M.

2. The method of claim 1, wherein, the number p also depends on the information carrier key.

3. The method of claim 1, wherein the identifier R is associated with a recording sequence number.

4. The method of claim 1, wherein the identifier R is present on the information carrier.

5. The method of claim 1, wherein the identifier R is present in the read and/or write apparatus which cooperates with the information carrier.

6. The method of claim 1, wherein the number p is derived unambiguously by applying a hash function to the identifier R.

7. The method of claim 1, wherein i numbers p are determined, namely a first number p1 through an ith number pi, in that i substrings are determined, namely an M1-bit substring, determined by reading out the N-bit string from a position q1 defined by the first number p1, through an Mi-bit substring, determined by reading out the N-bit string from a position qi defined by the ith number pi, after which the M-bit master key is formed by combining the i substrings.

8. A read and/or write apparatus comprising:
   means for generating an access key for controlling the access to read and/or write information on an information carrier, depending on an M-bit master key; and
   means for selecting the M-bit master key from an N-bit string, the M-bit master key being selected depending upon an identifier R, which is associated with a recording of information on the information carrier, by determining a number p depending on the identifier R and by reading only a portion of the N-bit string from a position defined by the number p, N being substantially greater than M.

9. The apparatus of claim 8, wherein, the number p also depends on an information carrier key.

10. The apparatus of claim 8, wherein the apparatus further comprises memory means for storing a recording sequence number and/or the identifier R.

11. The apparatus of claim 8, wherein the selection means determine i numbers p, namely a first number p1 through an ith number pi, and determine i substrings, namely an M1-bit substring, determined by reading out the N-bit string from a position q1 defined by the first number p1, through an Mi-bit substring, determined by reading out the N-bit string from a position qi defined by the ith number pi, and the M-bit master key is formed by concatenating the i substrings.

12. An information carrier comprising:
   information recorded on the information carrier;
   an information carrier key that can be determined by scanning the information carrier;

an identifier R associated with the recording of the recorded information and that can be read from the information carrier; and encryption means for preventing access to the carrier without an access key, determination of the access key depending on both the information carrier key and the identifier R.

13. The carrier claim 12, wherein the identifier R is associated with a recording sequence number.

14. A method of generating an access key for accessing information on an information carrier, comprising the steps of:

retrieving an identifier R associated with an existing recording on the information carrier;

determining a number pi depending on the identifier R;

selecting a portion of an N-bit string depending on the number p, the portion being less than the entire N-bit string;

determining an M-bit master key depending on the selection of the portion of the N-bit string;

deriving a carrier key from the information carrier deriving the access key depending on both the carrier key and the M-bit master key.

15. The method of claim 14 wherein:

the number p also depend on the information carrier key;

the identifier R is associated with a recording sequence number;

retrieving the identifier R includes one or more of: retrieving from the information carrier, and retrieving from a memory of the read and/or write apparatus;

the number p is derived unambiguously by applying a hash function to the identifier R; and the M-bit master key depends on a plurality of Mi-bit substrings derived from different corresponding portions of the N-bit string, the corresponding portions being selected depending on different corresponding numbers pi.

16. A method of recording information on an information carrier, comprising:

generating a recording sequence number;

determining an identifier R depending on the recording sequence number;

saving the identifier R for use in subsequent access to the recorded information;

determining a number p depending on identifier R;

selecting a portion of an N-bit string depending on the number p, the portion being less then the entire N-bit string;

determine a M-bit master key depending on the selection of the portion of the N-bit key;

determining an information carrier key by scanning the information carrier; and determining an access key depending on both the M-bit master key and the information carrier key; and recording the information on the information carrier using the access key so that the recorded information can not be accessed without using the access key.

17. A recorder and/or reproducer of information on an information carrier, comprising:

means for determining an identifier R associated with recording of the information on the information carrier;

means for deriving a number p depending on the identifier R;

means for selecting a portion of an N-bit string depending on the number p, the portion being less than the entire N-bit string;

means for determining an M-bit master key depending on the selection of the portion of the N-bit string;

means for deriving a carrier key from the information carrier; and means for deriving the access key depending on both the carrier key and the M-bit master key;

and means for accessing the information carrier depending on the access key, for writing and/or reading information on the information carrier.

* * * * *